United States Patent
Rowan et al.

(10) Patent No.: US 7,303,369 B2
(45) Date of Patent: Dec. 4, 2007

(54) MAGNETIC VERTICAL AXIS WIND TURBINE

(76) Inventors: James A. Rowan, 11 Hunter's Court, Fonthill, Ontario (CA) LOS 1E4; Thomas J. Priest-Brown, 525 Eliza Crescent, Burlington, Ontario (CA) L7L 6J1

( * ) Notice: Subject to any disclaimer, the term of this patent is extended or adjusted under 35 U.S.C. 154(b) by 108 days.

(21) Appl. No.: 11/262,915

(22) Filed: Oct. 31, 2005

(65) Prior Publication Data

US 2007/0098563 A1    May 3, 2007

(51) Int. Cl.
*F03D 7/06* (2006.01)
(52) U.S. Cl. ............... 415/4.2; 416/132 B; 416/244 R; 416/DIG. 6
(58) Field of Classification Search ................ 415/4.2, 415/4.4, 907; 416/132 A, 132 B, 244 R, 416/240, DIG. 6; 290/44, 55
See application file for complete search history.

(56) References Cited

U.S. PATENT DOCUMENTS 206,631 A * 7/1878 Smith .......................... 416/117

7,144,214 B2 * 12/2006 Kinpara et al. .............. 415/4.4

FOREIGN PATENT DOCUMENTS

WO    WO 0144656 A1 * 6/2001

* cited by examiner

*Primary Examiner*—Edward K. Look
*Assistant Examiner*—Dwayne J White
(74) *Attorney, Agent, or Firm*—Robert C. Curfiss (57) ABSTRACT

A lift and drag-based vertical axis wind turbine in which the vertical axis and foils mounted thereon are magnetically levitated above the turbine's base, thereby reducing friction within the system. The foils or vanes are three-dimensionally shaped about the vertical axis so as to resemble the billowed sail of a sailing ship and capture wind through 360 degrees of rotation under any wind condition. The system has an axial flux alternator using variable resistance coils which can be individually and selectively turned on or off depending on wind conditions and electrical draw requirements. The coils can also be used to produce mechanical drag on the system as desired to brake the turbine in high wind conditions or for maintenance. The system may be programmed to assess whether electricity generated by the system can be or should be transmitted to a public grid or stored locally on a chargeable battery system.

15 Claims, 4 Drawing Sheets

MAGNETIC VERTICAL AXIS WIND TURBINE

BACKGROUND OF INVENTION

The present invention relates generally to wind turbines, and more particular to low resistance, vertical axis wind turbines that utilize a unique airfoil design to enhance rotation in winds from a single direction, multiple directions including winds blowing from directly above, and cyclonic winds.

In recent years there has been a dramatic increase in the demand for energy in all forms including fuels and electricity for heating, lighting, transportation and manufacturing processes due to the world's population rapidly increasing, the supply and price-volatility problems of using petroleum and other "fossil" fuels for energy, and the accelerated technological development of large sectors of the world. Despite the construction of hydroelectric facilities and the development of fossil fuel resources at a rapid rate, it has become increasingly evident these efforts are inadequate to keep pace with the growing population's demand. First, fossil fuels such as oil and natural gas are increasingly becoming higher in cost and their availability is limited. Second, the hope that nuclear power would soon lead to a rapid solution of the energy dilemma has been tempered by environmental and safety concerns.

In the face of these growing demands and the resulting research in many fields of energy, wind energy has once again become the focus of such research, in part because the source of such energy, namely wind, is readily available to every country in the world in virtually unlimited quantities, subject only to use of wind turbines or other devices capable of converting the motive force of the wind into energy in a form usable by modern technologies. The interest in the development and harnessing of wind energy for use in homes and factories in the form of electricity is rising as with the rising costs and prices of traditional fossil fuel energy. Wind energy is also desirable because it can be converted to practical use without environmental contamination or chemical air pollution concerns.

One method of converting wind energy to practical use is through the use of a wind turbine. Traditional wind turbines, including what is historically known as a windmill, are horizontal axis wind turbines (HAWTs), wherein blades or vanes are secured to a horizontally supported shaft. As wind impinges on the blades, the horizontal shaft rotates, which rotation can then be translated into electric energy. Typically, the horizontal shaft itself pivots about a horizontal axis (hence the "horizontal axis wind turbine" name) so that the shaft and blades can pivot with the prevailing wind direction so that the shaft and blades can change their orientation as the winds change direction. One drawback to HAWTs is the inefficiencies caused by friction arising from the supported shaft. HAWT turbines utilize bearings for turning, and such bearings can wear out and need replacement. An additional drawback to HAWT turbines is that only the prevailing wind from a single direction can be "harnessed" at any one time to generate energy, so that the HAWT design can be inefficient or the blades and associated gearing can be damaged in changeable or turbulent winds, due to torque. Another drawback is that HAWT wind turbines may not turn or may need mechanical assistance to begin turning, if the wind speed is too low to counter the inertia of the HAWT rotor and bearings.

More recent developments in wind turbine technology have focused on vertical axis wind turbines (VAWTs), wherein a foil or vane is mounted on a vertically supported axis. Because of their vertical axes of rotation, VAWTs do not require alignment with the direction from which the wind is blowing. Prior art VAWTs include drag-based designs that move by being pushed by the wind, and lift-based designs which move from lift that is developed by the vanes. These prior art designs suffer inefficiencies due to drag during part of the rotation, which is a consequence of the vane shapes and gearing.

Various attempts have been made in the prior art to develop a method for utilizing wind energy by use of a vertical axis type windmill/wind-turbine. For example, U.S. Pat. No. 226,357 issued Apr. 6, 1880, describes a drag-based vertical axis windmill design. This patent teaches a windmill design that utilizes flat "fans" mounted pivotally on a support structure to catch wind and cause the support structure to rotate. As the fans orbit the vertical axis, they pivot between a downwind orientation, presenting a broad area that catches the wind, and an upwind orientation in which a narrower profile passes before the wind in order to create less drag. One drawback to this design is that the flat fans are not very aerodynamic in design and thus operation is rough and slow, with the fans being pulled out of position by centrifugal force. The fans provide drive only intermittently during a somewhat small portion of each rotation. Further, upright structural bars at the outermost ends of the fans obstruct airflow and prevent the system from achieving rotor speeds faster than wind speed.

Another illustration of the development of VAWT's is found in U.S. Pat. No. 2,038,467 issued on Apr. 21, 1936, wherein there is described a vertical axis drag-based windmill design that employs flat "vanes" on a rotating frame. The two-phase vanes are balanced on the vertical axis so that they pivot about 170 degrees between a high-drag position downwind and a low-drag position upwind. The windmill exhibits drag rotation over 180 degrees of each revolution, but vane interference of the upwind vane over the downwind vane in its wind shadow reduces overall effectiveness. Thus, the effective transference of force occurs over less than 180 degrees.

Other VAWT prior art attempts utilizing a lift-based design. For example, U.S. Pat. No. 4,383,801 issued May 17, 1983, discloses a lift-based VAWT that includes vertically arranged vanes mounted pivotally on a rotating base. As the vanes catch the wind and move the support, they orbit the vertical axis. A wind-vane-controlled pitch adjustment continually orients the airfoils relative to the wind direction. The device detects wind direction by means of a vane and positions the controlling pitch flange accordingly. One drawback to this patent is that the positioning of the airfoils is truly effective only in the directly windward and directly leeward positions, using crosswind lift force in both cases.

Another example of a lift-based VAWT is U.S. Pat. No. 6,688,842 issued Feb. 10, 2004. In this patent, a VAWT with "free flying" airfoils is taught, wherein the airfoils are self-positioning according to the local dynamic conditions to which they are subjected, thereby creating a condition of equilibrium in order to make the "engine" more efficient. More specifically, the patent teaches a vertical axis wind engine with a rotor mounted on a base for rotation about a vertical axis. One or more airfoil(s) is mounted on the rotor so that it is free to pivot between preset first and second limits of pivotal movement (e.g., set by stop mechanisms). That arrangement enables the airfoil to align according to the wind as it orbits the vertical axis, thereby achieving better conversion of wind energy to useable rotational energy by combining lift and drag characteristics at low speeds and shifting to lift-only characteristics at rotor speeds approaching or exceeding local wind speed. Wind forces and armature-constraining action establish airfoil positions. The airfoils rotate freely through an arc of approximately 90 degrees, bounded by stop mechanisms. The span of travel is from a radial line along the mounting arm (radially aligned relative to the vertical axis) to a perpendicular position (tangentially aligned relative to the vertical axis). This prior art design allows for each airfoil to set its own instantaneous angle and to adjust to conditions of relative wind, wind shift, and so forth occurring outside and within the wind engine, "without external adjustments or mechanisms, wind vanes, centrifugal governors, or other controlling devices." Individual airfoils adjust to local conditions based on changes of rotor speed, turbulence, true relative wind, and other factors affecting each of them independently. A drawback to this design, however, is that the efficiency is limited because the airfoils rotate through only about a 90 degree arc (out of a possible 360 degrees) and are constrained by stops.

A further drawback to the various VAWTs of the prior art is similar to those inefficiencies found in the HAWTs, namely that there is a relatively large amount of weight carried by the bearings that support vertically rotating component of the VAWTs. In addition to the loss of energy resulting from the friction between the relative components, this leads to the need to replace bearings on a regular basis.

Notwithstanding the foregoing, in recent years various electricity generating utilities have conceived of the need to promote "distributed generation" of electricity as a means of decentralizing the commercial electricity grid, which suffers from centralized generation plants and switching and transmission lines that are sometimes old and in poor repair, such that a grid may become unstable and prone to outages of electrical power. In response and as a means of diminishing the risk of rising energy costs to the consumer, it has become more prevalent to generate electricity from renewable sources of energy using decentralized devices located on buildings or on land or in yards belonging to small commercial companies or even individuals. While it is most common in remote locations that this renewable-sourced electricity is generated solely for local consumption, in other locations where a grid connection is available, electrical utilities are offering "net metering". Net metering equipment allows "co-generation" of electrical power, such that both the utility and the end user can generate electricity. Since the bi-directional electric meter accurately registers the flow of electricity in both directions, net metering not only helps to maximize the value of distributed generation, but does so with little cost to the consumer. In other words, the meter spins forward when the customer uses more electricity than is being produced, and spins backward when the customer is producing more electricity than is needed.

Therefore, as interest in co-generation grows, there is a need for better, more efficient renewable-energy electricity generating devices. An improved VAWT capable of harnessing wind from a full 360 degrees of rotation about the vertical axis would be one such device. Desirably, the VAWT should also harness vertically impinging wind and cyclonic wind. The VAWT also should minimize inefficiencies arising from frictional losses. Preferably, the VAWT materials should maximize strength and durability but have a low cost of manufacture so as to be economically available to consumers for use in individual households.

SUMMARY OF THE INVENTION

These and other benefits are found in the present invention which provides a lift and drag-based vertical axis wind turbine in which the vertical axis and foils mounted thereon are magnetically levitated above the turbine's base, thereby reducing friction within the system. The foils are shaped to maximize operation of the system, regardless of the wind direction. More specifically, the foils are three-dimensionally shaped about the vertical axis so as to resemble the billowed sail of a sailing ship; hereinafter the foils will be referred to as sails or vanes. The sails (or vanes) capture wind through a full 360 degrees of rotation under any wind condition. The system is further provided with an axial flux alternator using variable resistance coils which can be individually and selectively turned on or off depending on wind conditions and required electrical draw requirements. The coils can also be used to produce mechanical drag on the system if required to brake the turbine in high wind conditions or for maintenance. The system may be programmed to assess whether electricity generated by the system can be or should be transmitted to a public grid or stored locally on a chargeable battery system. Finally, the system may be programmed to report system usage such as the amount of electricity produced, the amount of electricity used and the amount of electricity sent to a grid or stored. Likewise, the system can report outages to individuals and local authorities.

The system thus described is small, light in weight, and easy to install upon a flat or peaked rooftop. This vertical axis wind turbine is robust as to interaction with the weather. Most importantly, the present invention is capable of effectively using wind blowing from all sides simultaneously, including from above. Since the present invention is able to utilize wind from all directions, it can generate electricity even in low-speed winds. Also, since the wind turbine is magnetically levitated, the present invention is quiet in operation and, because the rotational bearings do not support the weight of the turbine sails, the bearings very seldom need replacement. The magnetic levitation results in very little spinning resistance, and hence, increased efficiencies. Efficiencies are also enhanced by the curved shape of the vanes or sails.

It is an object of the present invention to provide a new and improved wind turbine design.

A further object of this invention to provide a wind turbine design which is susceptible of a low cost of manufacture with regard to both materials and labor, and which accordingly is then susceptible of low prices of sale to the consuming public, thereby making wind generation of electricity economically available to the buying public.

Another object of the present invention is to provide a wind turbine design that is manufactured with materials used in manufacture in order to maximize strength and durability while minimizing weight. The vanes or sails of the present invention can be manufactured from light, strong composite materials or light, strong metals that are able to maintain their structural integrity even in hurricane-force winds.

Another object of the present invention is to provide a wind turbine design that allows the vanes or sails to be magnetically levitated so that no bearings are needed between the rotor and the base. This significantly decreases drag that might occur due to gravity and friction.

Another object of the present invention is to provide a wind turbine design that is capable of utilizing wind energy from all directions. The sails are curved like those of a sailing ship in order to maximize the opportunity to scoop wind (which is the drag-driven component) from a larger area than a flat vane could. This also protects the device from contrary or turbulent winds such as might be prevalent during storms. Because of the sail shape, the present invention can tolerate and utilize winds blowing even from directly above the wind turbine, in a manner that other devices cannot. This means that the wind turbine can continue to operate during thunderstorms or hurricanes, or atop high buildings where significant wind turbulence may exist either continuously or as an intermittent condition. In such turbulent wind conditions, wind turbines of the prior art would have to be curtailed or "feathered" to prevent damage to the vanes and gearing of the wind turbine. The present invention has no such vulnerability.

A further object of the present invention is to provide a wind turbine design that has a vane design that enhances the efficiency of the wind turbine by creating lift at certain rotational points when the vane rotation is in opposition to the direction of the wind. The sails are curved like those of a sailing ship in order to allow the wind turbine to create lift similar to a sailing ship in a "close haul." Not only does this increase the efficiency of the wind turbine, but it also protects the device from contrary or turbulent winds.

A further object of the present invention is to provide a wind turbine design that has a graceful shape, which makes it visually appealing, in a manner similar to "wind art."

DETAILED DESCRIPTION OF THE PREFERRED EMBODIMENT

In the detailed description of the invention, like numerals are employed to designate like parts throughout. Various items of equipment may be omitted to simplify the description. However, those skilled in the art will realize that such conventional equipment can be employed as desired.

Figure 1:
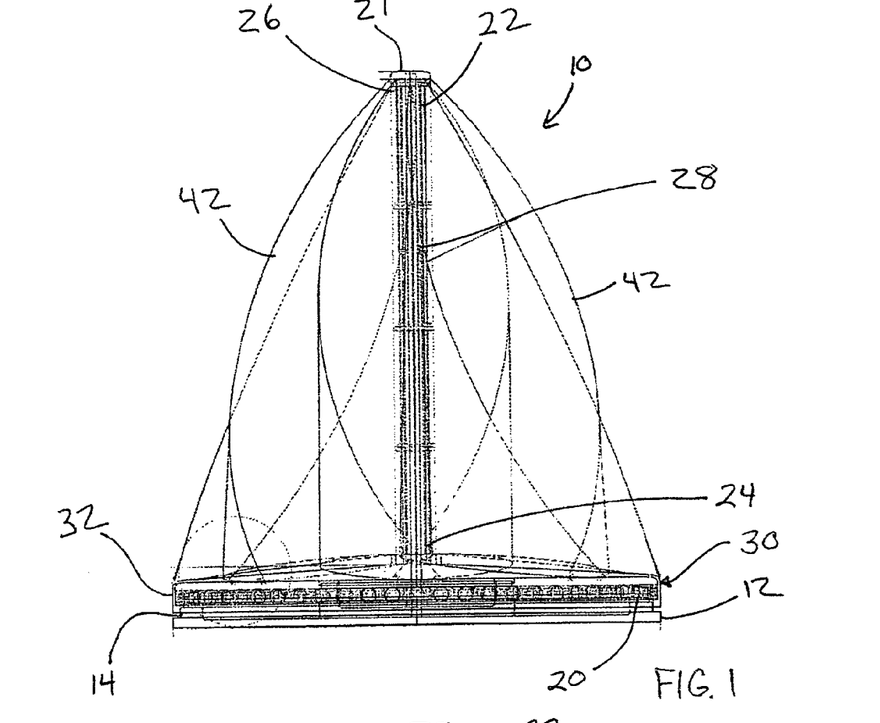
FIG. 1 shows a side view of a magnetic vertical axis wind turbine of the present invention.
Figure 2:
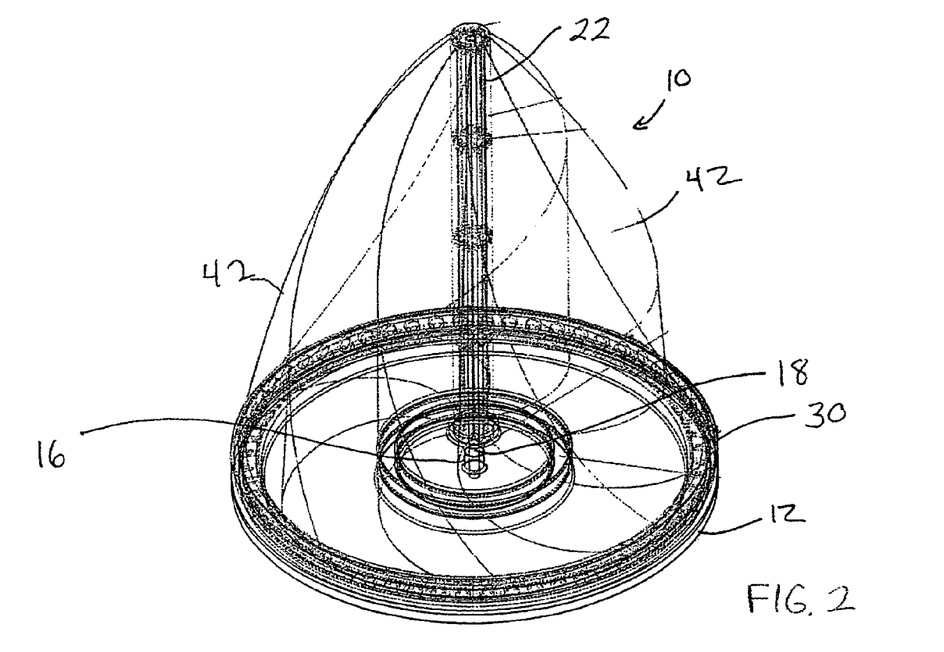
FIG. 2 depicts an exploded view of the magnetic vertical axis wind turbine of the present invention.

With reference to FIGS. 1 and 2, the magnetic vertical axis wind turbine 10 of the present invention is illustrated. Specifically, there is shown a substantially circular base 12 defined by a vertical edge 14 at its outer perimeter and a central hub 16. A center rod 18 attaches to central hub 16 and extends axially from base 12. Disposed around outer perimeter of base 12 on vertical edge 14 is a plurality of magnetic transformers 20. An axial shaft 22 having a first end 24, a second end 26 and axial grooves 28 along its length is pivotally mounted on center rod 18. Shaft 22 rotates axially relative to rod 18 and base 12. Center bearings 19 may be positioned on rod 18 or within shaft 22 to facilitate relative rotation and ensure axial alignment of shaft 22 and rod 18. In one preferred embodiment, shaft 22 is segmented into multiple segments (in the case of FIG. 2, four segments) and multiple bearings 19 are utilized so that the height of shaft 22 can be adjusted as desired. A top cap 21 may be placed over the top most center bearing 19.

Mounted on shaft 22 is a substantially circular rotor or cover 30 which has an outwardly extending surface 31 terminating at an outer perimeter vertical edge 32. Disposed around the outer perimeter edge 32 of rotor 30 is a plurality of magnets 34. Rotor 30 is mounted on shaft 22 so as to be concentric with base 12, whereby the outer perimeter edge 32 of rotor 30 is adjacent the outer perimeter edge 14 of base 12 such that magnets 34 are aligned with transformers 20 in a horizontal plane. In one preferred embodiment, sixty magnetic transformers 20 are provided on base 12 and sixty magnets 34 are provided on rotor 30. Center rod 18, being attached in a fixed non-rotational position to base 12, in addition to providing support for shaft 22 and rotor 30, also provides alignment for base 12 and rotor 30 and hence the adjacent transformers 20 and magnets 34.

A first levitating magnet 36 is mounted on base 12 and a second levitating magnet 38 is mounted on rotor 30 so that magnet 36 and magnet 38 are adjacent one another when rotor 30 and base 12 are axially aligned. Those skilled in the art will understand that the polarities of magnets 36 and 38 are such that the magnets repel one another when mounted as described herein. In such case, rotor 30 will "levitate" above base 12 on center rod 18. The levitating magnets 36, 38 enable rotor 30 and vanes 42, or wind turbine portion of the device, to "levitate" magnetically off of base 12, thus providing substantially frictionless rotation of rotor 30 relative to base 12 and obviating the need for wheels or bearings therebetween. As such, the efficiency of the wind turbine 10 is increased because less energy is needed to overcome the resistance between rotor 30 and base 12. While any configuration of magnets 36 and 38 as disposed on corresponding base 12 and rotor 30 is possible, in the preferred embodiment, each magnet 36, 38 is ring shaped and concentrically disposed in recesses 40 defined on base 12 and rotor 30.

Figure 3:
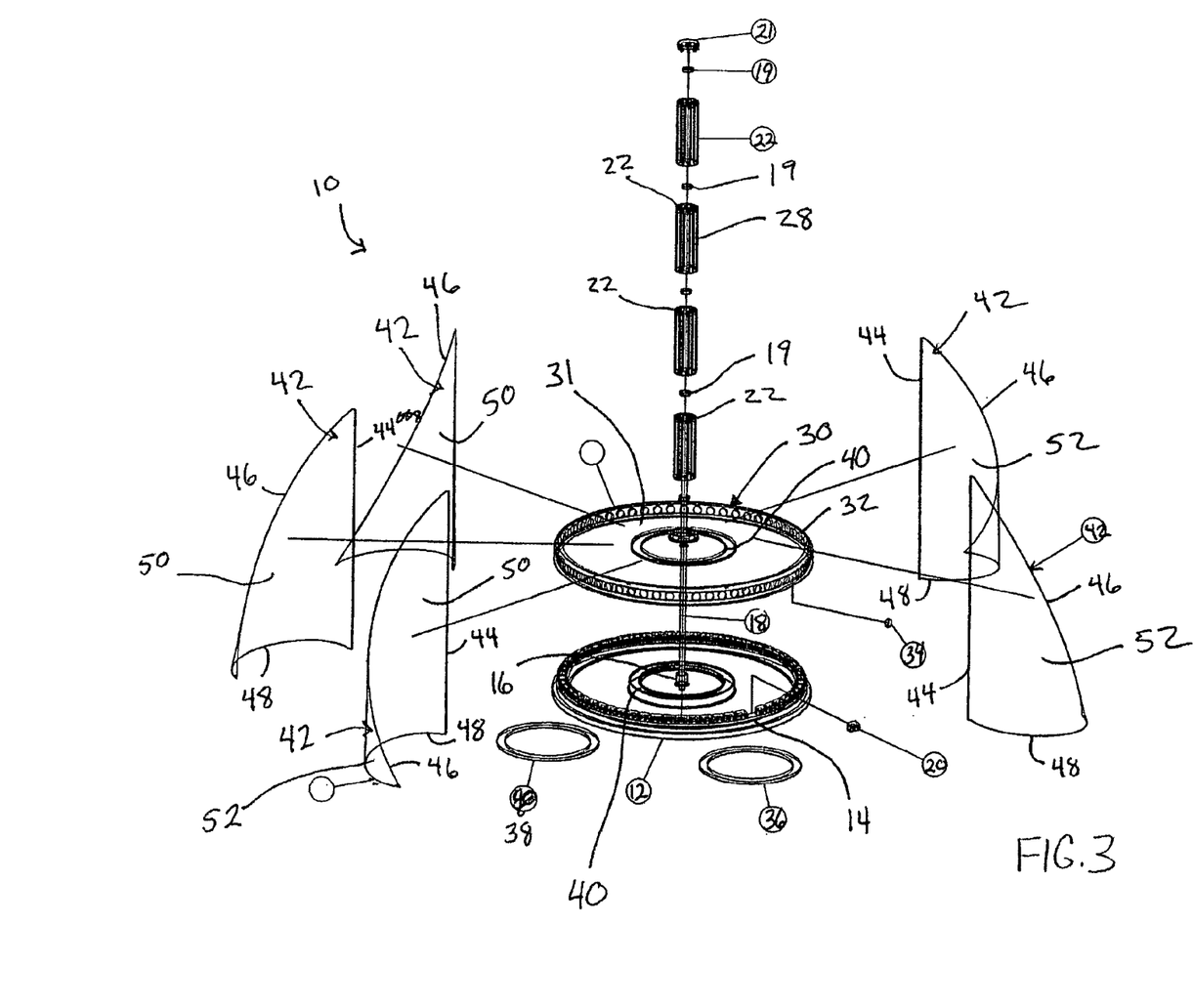
FIG. 3 illustrates a top view of a magnetic vertical axis wind turbine of the present invention.

A plurality of triangular shaped vanes 42 are mounted on shaft 22. Each vane 42 is characterized by an inner edge 44, an outer edge 46 and a lower edge 48. As further illustrated in FIG. 3, outer edge 46 is curved axially about inner edge 44 so as to define an inner surface 50 and an outer surface 52 for vane 42. In one preferred embodiment, inner edge 44 is linear, while edges 46 and 48 are curvilinear, thereby taking on the shape of the billowed sail of a sailboat. In any event, inner edge 44 of vane 42 is disposed to mount in an axial groove 28 of shaft 22 so that lower edge 48 abuts surface 33 of rotor 30 and the distal end of lower edge 48 terminates adjacent vertical edge 32 of rotor 30. Vanes 42 are preferably equally spaced about shaft 22 in the same direction radially on top of rotor 30. In one preferred embodiment, eight vanes 42 are utilized.

Figure 4:
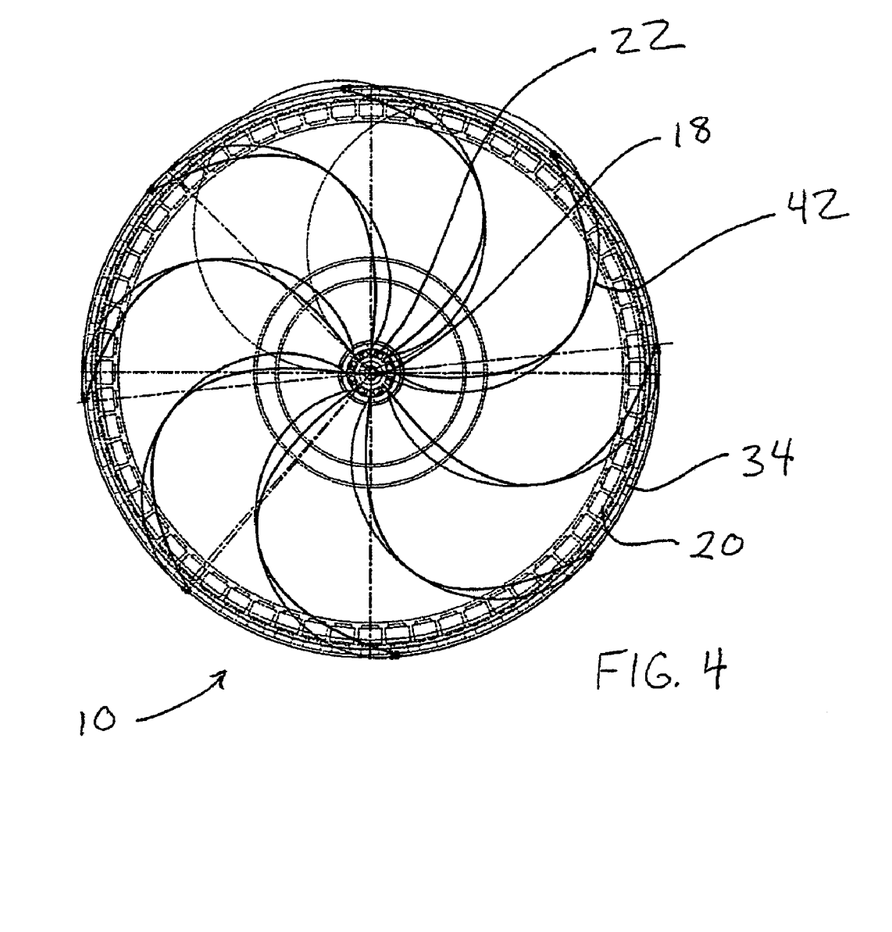
FIG. 4 a cross section of the base of the magnetic vertical axis wind turbine of the present invention.
Figure 5:
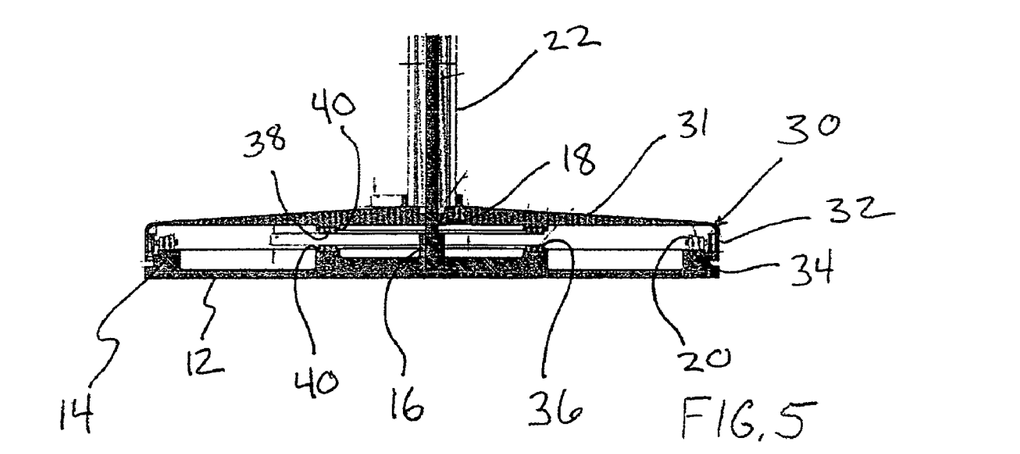
FIG. 5 shows an elevation view of a magnetic vertical axis wind turbine of the present invention.

With reference to FIG. 4, one embodiment of a cross section of the base 12 and rotor 30 of the magnetic vertical axis wind turbine 10 is illustrated, and more specifically, the relative positions of magnetic transformers 20 mounted on base 12 and magnets 34 mounted on rotor 30 are shown. In this embodiment, edge 14 of base 12 is illustrated as being located inwardly of edge 32 of rotor 30, thereby protecting both transformers 20 and magnets 34 from external exposure. Additionally, center rod 18 is shown secured in hub 16 of base 12. A recess 40 is shown in each of base 12 and rotor 30. Recesses 40 are axially positioned to face one another and are each disposed for receipt of their corresponding levitating magnet 36,38. A portion of shaft 22 (without any vanes 42 shown) is illustrated and shown attached to rotor 12.

Turning to the wind turbine component, or "wind engine", of the invention, namely the vanes 42, the shape and placement of the vanes are specifically provided to yield improvements in both rotation torque and efficiency. There is a five-step sequence to wind turbine technology that is generally known in the art:

1. Upwind Lift Phase. This begins approximately in the upwind position and continues to approximately 60 degrees past it, depending on wind and rotor speed conditions.
2. Downwind Drag Phase. This begins at approximately 60 degrees downwind and continues to around the 120 degree position.
3. Transitional Phase. At about the 120 degree position, the airfoil rotates its orientation by 90 degrees and converts its rotational energy into rotor thrust by the law of conservation of rotational inertia.
4. Leeward Lift Phase. Positioned crosswind by the transitional phase, the airfoil now sweeps across the leeward side of the system.
5. Upwind Phase. The airfoil returns to windward, positioning itself for minimum drag.

In the present invention, power is produced in four of the five phases, as more particularly described below.

The vertical axis wind turbine 10 is designed to be mounted on a roof top. When the wind strikes the roof and building at different angles throughout the year, the wind creates air currents coming from different directions, sometimes simultaneously. For example, if the wind is blowing from the other side of a roof peak, force is created by the wind that hits the turbine 10 directly, plus the wind that is redirected from hitting objects on the roof. These objects on the roof include roof vents, television satellite dishes, chimneys and the other elevated roofs. In addition, there may be vortices of wind turbulence curling back from over the roof and striking the turbine from above. Because of these conditions, most roof mounted prior art VAWTs have been ineffective. However, the vanes or sails 42 of the vertical axis wind turbine 10 of the current invention are designed so that the wind can strike them from all directions simultaneously; this then causes the wind turbine 10 to spin faster.

As described above, each vane 42 preferably resembles a ship's sail, configured for a "close haul" to the wind. The overall visual effect gives the wind turbine 10 an appearance like an "auger" or "impeller."

To the extent that wind strikes the wind turbine 10 from a single direction, the curved shape of a vane 42 allows the wind turbine 10 to catch the wind through 280 degrees of the rotation of vane 42. Specifically, for approximately 20 degrees, vane 42 luffs (does not catch any wind or face any wind)—similar to the sail of a sailboat. Through the next 100 degrees, vane 42 develops lift from the passage of the air over the curved shape of vane 42, similar to a sailboat with its sail configured for a "close haul". Through another 40 degrees, vane 42 of the wind turbine 10 moves in opposition to the wind, creating "drag". Through the final 20 degrees, vane 42 is in a luff position again.

When wind impinges on all vanes 42 of the wind turbine 10, some vanes 42 receive a "push" through 180 degrees at the same time as other vanes 42 receive wind through the 20 degrees of luff, while still other vanes 42 receive force through the 100 degrees of lift and the remaining vanes 42 receive wind-force through the other 40 degrees of luff. As such, power is produced from four of the five phases discussed above, which is equivalent to at least 280 degrees out of 360 degrees of rotation. Further, because of the multiple vanes 42 utilized in turbine 10, the drag and luff portions of one vane 42 may be offset by the other vanes 42 at any one moment in time.

Significantly, the combined effect of push on one side and lift on the other side gives the wind turbine 10 the ability to spin faster than the speed of the wind from any one direction. Specifically, in a multiple wind-direction situation, i.e. when cyclonic winds blow from several directions at once or when the wind is blowing straight down upon the wind turbine 10 from above, all vanes 42 are experiencing more lift than drag through their entire rotation. The effect is that the wind turbine 10 actually spins faster when having winds strike it from more than one direction, and spins quickest of all when the wind is blowing from above. As such, it is possible for vanes 42 to spin much faster than the speed of the wind.

With respect to generation of electricity, the magnetic transformers 20 and magnets 34 are the principal components of what may be referred to as the axial flux alternator for turbine 10. In the preferred embodiment, magnetic transformers 20 may be a cored coil or a coreless coil and magnets 34 are passive magnets. Those skilled in the art will understand that the term "axial flux" refers to a type of alternator where magnets are mounted on disks and the flux between them is parallel to the axis of the shaft and is desirable for generating an electric current even when rotational speed is low. An electric current is produced by magnetic transformer 20 as magnets 34 are rotated past the transformers. In any event, the axial flux alternator arrangement described above is used in the current invention to generate an electric current. The magnetic transformers 20 are incorporated as part of the circuit of the axial flux alternator. Moreover, while FIG. 4 illustrates edge 14 of base 12 being located inwardly of edge 32 of rotor 30, the relative positions of edges 14 and 30 could be reversed or an additional edge 14 carrying additional transformers 20 could be located outwardly of edge 32 and magnets 34 so as to maximize the amount of electricity produced by turbine 10.

While one preferred embodiment of the invention has been described with 60 magnets 34 and 60 magnetic transformers 20, in another preferred embodiment of the invention, turbine 10 includes 100-300 magnets 34 which pass over 100-400 magnetic transformers 20, or coils of wire, thus generating electricity by induction. In one example, the frequency of the current typically ranges from 100 cycles to 7500 cycles. Preferably, the current is first converted to DC and then back to AC 60 cycle current before it is conveyed to either electrically-powered machines (not shown), an electrical storage system, such as a battery system (not shown) or connected to a commercial electrical grid (not shown) for use by the local electrical utility.

One novel feature of the turbine 10 is the ability to selectively activate and deactivate magnetic transformers 20 as needed to control rotational drag. One drawback to the VAWTs of the prior art is that, with a full generator load holding it back, they are often very difficult to get started, i.e., generating sufficient torque to overcome friction creating drag on the rotating hub. In some prior art VAWTs, an electric motor was used to achieve a minimum rotation speed for the vanes (of those designs) in order to overcome this start-up drag. Because of the magnetic levitation system of the current invention, much of this frictional resistance or drag has been eliminated. However, the turbine 10 of the present invention also provides magnetic transformers 20, or variable resistance coreless coils, that can be turned on and off by a computer (not shown) to vary the drag on rotor 30. These magnetic transformers 20 do not produce electricity or drag on the system until they are turned on. This means that the drag on the wind turbine 10 can be controlled according to its rotational speed. The higher the speed, the more magnetic transformers 20 that are turned on. The turbine 10 has several hundred magnetic transformers 22 that can be turned on and off to achieve the desired drag. In this regard, the magnetic transformers 22 can also operate to slow down the wind turbine 10 in high winds, but do not impede the rotation when winds are light and of little strength.

A controller (not shown) for turbine 10 determines the number of magnetic transformers 20 that should be active at any given time. Preferably, a small number of magnetic transformers 20 are active at all times. The turbine 10 may include a sensor (not shown) that can determine the rotational speed of the wind turbine 10. The controller compares the rotational speed of turbine 10 against the amount of electricity that is being produced from the active magnetic transformers 20. Once the controller has determined that turbine 10 is spinning faster than the programmed optimum rpm range for a given amount of electrical generation, the controller may turn on additional magnetic transformers 20. On the other hand, if the rotational speed of turbine 10 slows, the controller may then turn off a select number of magnetic transformers 20 in order to increase the rotational speed.

The wiring on the magnetic transformers 20 consists of four different patterns. All of the magnetic transformers 20 are wired to one of these patterns. The patterns keep the wave peak/trough canceling effect from reducing the amount of electricity produced. The patterns are North-North-South Gap-South-South North Gap. The role of the magnet orientation is thus: all the coils (transformers) that are going to be over a magnet oriented to a specific orientation are named the same and wired together. This means that all of the transformers 20 in the North pattern will be over a North pole at the same time, and thereafter leave that pole at the same time. The coils used in wiring base 12 (which does not rotate, but remains stationary) are of coreless type because coreless coils only provide magnetic resistance when they are connected to a load. The interaction between the rotating magnets 34 and the stationary coils 20 causes generation of electrical current. The high frequency electrical current from each wiring pattern flows to a rectifier to be converted into direct current (DC).

Figure 6:
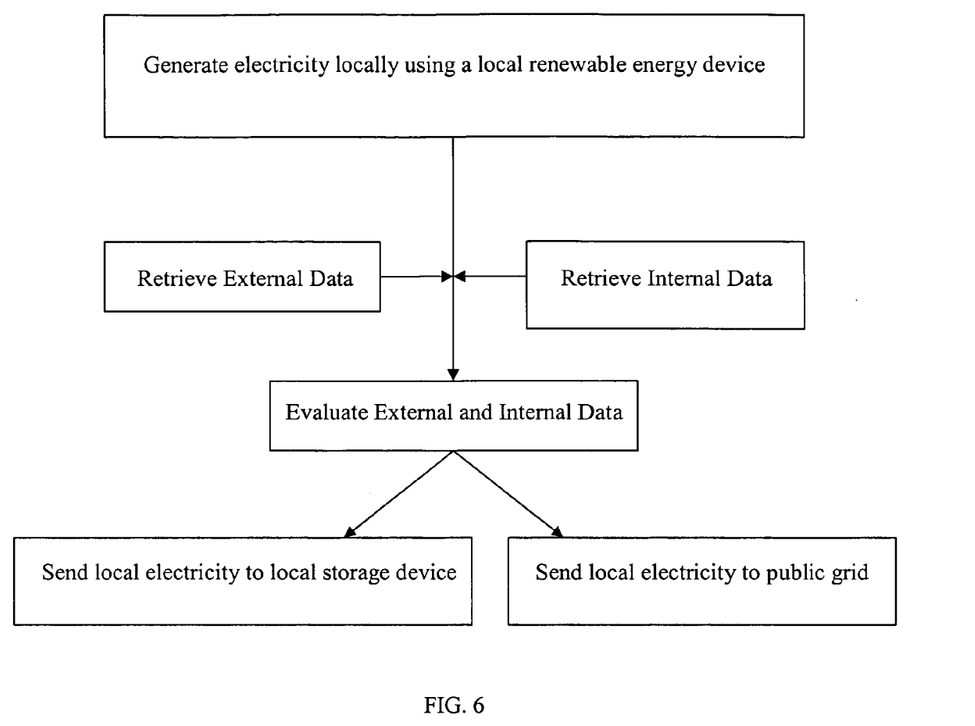
FIG. 6 is a flow diagram illustrating certain functions of the winds turbine's controller.

Finally, the foregoing controller may also be programmed to assess whether electricity generated by turbine 10 can be transmitted to a public grid or should be stored locally, such as on a chargeable battery system. More specifically, the controller may be programmed to access or otherwise receive external data related to co-generation, power costs, and the availability of a public grid to receive co-generated electricity from the turbine 10. Once the controller has evaluated these parameters, it can take appropriate action to control the electricity by deciding where to send the electricity. FIG. 6 illustrates for example, if the controller determines it is not profitable to send electricity to a public grid, then the controller may direct the electricity to a local storage device. In another example, there may be no public draw connection or it could be that the need of the local public grid for co-generated electricity at that moment is zero. Likewise, the controller may evaluate the status of a local storage system, such as a large capacity uninterruptible power supply (UPS) and maintain a local database of such. The controller may decide to send some of the electricity to a local utility grid and some to a local storage system. For example, if the local storage system is a rechargeable battery system or a UPS, then the controller, by means of sensors, may determine whether the battery system is charged to 100% of capacity and take appropriate action to recharge to such a level. Local data may also consist of a historical database battery efficiency. Similarly, the controller may also monitor local energy usage and maintain a local database of historical energy usage and thus be ready to provide more energy at peak hours, less energy at off-peak hours, or generate a report or 'alert' if the local public grid is anomalous because of usage that could signal an equipment malfunction or other noteworthy condition. This is an important safety feature that can protect both the user of the wind turbine (for electricity generation), and also the electricians and line crews of the electricity-generation utility. It can also assist the utility in mapping or pinpointing localities where a grid outage exists, as discussed further below.

If a local battery system is fully charged, then the controller may evaluate the value of the generated electricity in terms of energy market prices at that moment in terms of the price to efficiency ratio of the other connected storage device(s). The controller then decides whether the return amount of electricity justifies sending the electricity to one or another specific storage device.

Finally, the controller may be programmed to report system usage such as the amount of electricity produced, the amount of electricity used and the amount of electricity sent to a grid or stored. Likewise, the system can report outages to individuals and local authorities. The controller may use a regular telephone line, WLAN, WIFI, or cellular telephone connection to obtain external data and to report both usage and outage conditions. Typically, a usage report would consist of the following: the amount of electricity produced by the wind speed (if equipped with an external anemometer), the amount of electricity used and the amount of electricity sent to the local electrical grid.

Outage reporting may also occur when the meter or safety cut off switch indicates that there is no electricity on the grid side connection. A signal or report to the outage reporting center may be generated to indicate that there has been an outage and to confirm that the unit is no longer sending electricity to the grid. This signal or report may then be passed on to the local utility to create an outage "footprint" or map showing the units reporting the outage and the units not reporting.

While certain features and embodiments of the invention have been described in detail herein, it will be readily understood that the invention encompasses all modifications and enhancements within the scope and spirit of the following claims.

We claim:

1. A vertical axis wind turbine comprising:
   a. a base defined about a vertical axis and having a first magnet mounted on said base;
   b. a rotor defined about a vertical axis and having a second magnet mounted on said rotor; and
   c. a plurality of vanes mounted on said rotor,
   d. wherein said rotor is positioned adjacent said base so that said first magnet of said base is disposed adjacent said second magnet of said rotor thereby causing said rotor to be rotatingly suspended above said base.

2. The wind turbine of claim 1, wherein said rotor includes an axially positioned aperture, said turbine further comprising a center rod axially attached to said base and extending through said aperture of said rotor.

3. The wind turbine of claim 2, wherein said rotor further comprises a hollow shaft concentrically attached to said rotor over said aperture, such that said rod extends through said shaft.

4. The wind turbine of claim 3, wherein said vanes are attached to said shaft.

5. The wind turbine of claim 4, wherein at least one of said vanes is triangular in shape.

6. The wind turbine of claim 5, wherein said vane is defined by an inner edge, an outer edge and a lower edge, wherein said inner edge intersects said outer edge at a first point, said inner edge intersects said lower edge at a second point and said outer edge intersects said lower edge at a third point.

7. The wind turbine of claim 6, wherein said inner edge is defined along an axis and said outer edge curves around the axis.

8. The wind turbine of claim 6, wherein said outer edge is curvilinear.

9. The wind turbine of claim 6, wherein said lower edge is curvilinear.

10. The wind turbine of claim 6 wherein rotor is substantially circular and is defined by an outer perimeter and an inner perimeter terminating adjacent said aperture, wherein said third point of said vane is attached to said rotor adjacent said outer perimeter and said second point of said vane attaches to said rotor adjacent said inner perimeter.

11. The wind turbine of claim 1, wherein said base is characterized by an outer perimeter and said rotor is characterized by an outer perimeter and further comprising:
   a. a plurality of magnetic transformers attached at the outer perimeter of said base; and
   b. a plurality of magnets attached at the outer perimeter of said rotor.

12. A wind turbine comprising:
   a. a base defined about an axis;
   b. a rotor defined about an axis and coaxially mounted on said base;
   c. a plurality of triangular shaped vanes mounted on said rotor, wherein said vanes are characterized by an inner edge, an outer edge and a lower edge, wherein said inner edge intersects said outer edge at a first point, said inner edge intersects said lower edge at a second point and said outer edge intersects said lower edge at a third point and wherein said inner edge is defined along an axis and said outer edge curves around the axis.

13. The wind turbine of claim 12, wherein said the axis of said vanes are parallel to the axis of said rotor.

14. A vertical axis wind turbine comprising:
   a. a base defined about a vertical axis and having a first magnet mounted on said base, wherein said base is characterized by an outer perimeter;
   b. a rotor defined about a vertical axis and having a second magnet mounted on said rotor, wherein said rotor is characterized by an outer perimeter and wherein said rotor is positioned adjacent said base so that said first magnet of said base is disposed adjacent said second magnet of said rotor thereby causing said rotor to be rotatingly suspended above said base;
   c. a plurality of triangular shaped vanes mounted on said rotor, wherein said vanes are characterized by an inner edge, an outer edge and a lower edge, wherein said inner edge intersects said outer edge at a first point, said inner edge intersects said lower edge at a second point and said outer edge intersects said lower edge at a third point and wherein said inner edge is defined along an axis and said outer edge curves around the axis;
   d. a plurality of magnetic transformers attached at the outer perimeter of said base; and
   e. a plurality of magnets attached at the outer perimeter of said rotor.

15. A method of operating a vertical axis wind turbine, said method comprising the steps of:
   a. providing a vertical axis wind turbine having a rotor concentrically positioned over a base, wherein a plurality of magnets is positioned around the periphery of said rotor and a plurality of magnetic transformers is positioned around the periphery of said base;
   b. providing a controller to control the activation of said magnetic transformers; and
   c. using said controller to selectively activate and deactivate said magnetic transformers to control the drag between the rotor and the base.

* * * * *